(12) United States Patent
Kollu et al.

(10) Patent No.: US 11,086,758 B1
(45) Date of Patent: Aug. 10, 2021

(54) IDENTIFYING FIRMWARE FUNCTIONS EXECUTED IN A CALL CHAIN PRIOR TO THE OCCURRENCE OF AN ERROR CONDITION

(71) Applicant: AMERICAN MEGATRENDS INTERNATIONAL, LLC, Norcross, GA (US)

(72) Inventors: Naresh Kollu, Cupertino, CA (US); Harikrishna Doppalapudi, Norcross, GA (US); Purandhar Nallagatla, Johns Creek, GA (US)

(73) Assignee: AMERICAN MEGATRENDS INTERNATIONAL, LLC, Norcross, GA (US)

( * ) Notice: Subject to any disclaimer, the term of this patent is extended or adjusted under 35 U.S.C. 154(b) by 9 days.

(21) Appl. No.: 16/778,344

(22) Filed: Jan. 31, 2020

Related U.S. Application Data

(60) Provisional application No. 62/836,438, filed on Apr. 19, 2019.

(51) Int. Cl.
| | |
|---|---|
| G06F 9/44 | (2018.01) |
| G06F 11/36 | (2006.01) |
| G06F 9/46 | (2006.01) |

(52) U.S. Cl.
CPC .......... *G06F 11/3636* (2013.01); *G06F 9/463* (2013.01); *G06F 11/3612* (2013.01); *G06F 11/3692* (2013.01)

(58) Field of Classification Search
CPC .. G06F 11/3636; G06F 9/463; G06F 11/3612; G06F 11/3692
See application file for complete search history.

(56) References Cited

U.S. PATENT DOCUMENTS

| | | | |
|---|---|---|---|
| 2003/0005414 A1* | 1/2003 | Elliott | G06F 11/0766 717/128 |
| 2015/0058825 A1* | 2/2015 | Madampath | G06F 11/34 717/128 |
| 2015/0199517 A1* | 7/2015 | Rose | G06F 21/562 726/22 |
| 2015/0261596 A1* | 9/2015 | Muthukumsarasamy | G06F 11/366 714/57 |
| 2017/0177743 A1* | 6/2017 | Bhattacharjee | G06F 16/90344 |
| 2017/0371731 A1* | 12/2017 | Khan | G06F 11/366 |

* cited by examiner

*Primary Examiner* — Hang Pan
(74) *Attorney, Agent, or Firm* — Newport IP, LLC; Leonard J. Hope

(57) ABSTRACT

Technologies are disclosed for identifying firmware functions that were executed in a call chain prior to the occurrence of an error condition, such as an assert or an exception. In particular, a search is made from an instruction pointer ("IP") for a memory address containing a signature identifying a firmware module. The firmware module that includes a function that generated the error condition can be identified based on the memory address. The name of the function that generated the error condition can be identified using a function mapping file. Previous functions in the same call chain are identified and their names determined using the function mapping file. Output can then be generated that includes the name of the firmware module that includes the function that generated the error condition, the name of the function that generated the error condition, and the names of other functions in the same call chain.

20 Claims, 11 Drawing Sheets

IDENTIFYING FIRMWARE FUNCTIONS EXECUTED IN A CALL CHAIN PRIOR TO THE OCCURRENCE OF AN ERROR CONDITION

CROSS-REFERENCE TO RELATED APPLICATIONS

This application claims the benefit of U.S. Provisional Patent Application No. 62/836,438, entitled "IDENTIFYING FIRMWARE FUNCTIONS EXECUTED IN A CALL CHAIN PRIOR TO THE OCCURRENCE OF AN ERROR CONDITION," which was filed on May 19, 2019, and which is expressly incorporated by reference herein in its entirety.

BACKGROUND

Modern computer system firmware is typically developed in a modular fashion. For example, a particular firmware implementation might include hundreds or even thousands of firmware modules, which can include various libraries, drivers, functions, and other types of program code. Given the inherently complex nature of computer system firmware and the large number of firmware modules in a given firmware implementation, modern computer system firmware is extremely difficult to create.

Given its complexity, modern computer system firmware can also be extremely difficult to debug. One factor contributing to the complexity of debugging computer system firmware stems from the fact that limited information is typically available when firmware executing in debugging mode encounters an error condition. For example, very limited information might be made available to a programmer when an assert or an exception occurs in firmware code that is being debugged. This information typically identifies the location in the firmware where the assert or exception occurred.

The location in the firmware where an assert or exception occurred is commonly not the location of the firmware code that caused the error condition. For example, a first function in a chain of function calls might generate a value. A second, subsequent, function in the call chain might consume the value in an attempt to allocate memory or perform another function. If the value is out of bounds and therefore results in an error condition while performing the function, the location where the assert or exception occurred in the second function will be identified as the location of the error condition even though the value generated by the first function actually caused the assert or exception. Consequently, it can be difficult to identify the root source of error conditions in computer system firmware. This can result in firmware code that contains errors or unoptimized code, which can negatively impact the performance of computing systems executing the firmware.

It is with respect to these and other considerations that the disclosure made herein is presented.

SUMMARY

Technologies are described herein for identifying firmware functions that were executed in a call chain prior to the occurrence of an error condition, such as an assert or an exception. Through implementations of the disclosed technologies, the functions in a call chain of firmware functions that includes a function that caused an error condition, such as an assert or an exception, can be identified. Through this process, the function containing the root source of an error condition can be easily and quickly identified.

Implementations of the disclosed technologies enable firmware developers debugging a firmware to identify a firmware function causing an error condition more quickly and accurately than previously possible. This, in turn, enables firmware developers to create more reliable and performant firmware by addressing the root sources of errors in firmware functions. More reliable firmware can reduce the number of system failures, and might also save computing resources such as, but not limited to, processor cycles, memory, network bandwidth, and storage. Technical benefits other than those specifically mentioned herein can also be realized through implementations of the disclosed technologies.

In order to provide the technologies described herein, a stack pointer ("SP") and an instruction pointer ("IP") can be obtained following the occurrence of an error condition, such as an assert or an exception, caused by a function contained in a module of an executing firmware. When the firmware is a UEFI Specification-compliant firmware, the firmware can be executing in a Pre-EFI Initialization ("PEI) phase of operation or in a Driver Execution Environment (DXE) phase of operation.

The boundaries of the memory of the computing device executing the firmware can then be searched for a memory address containing a signature that identifies a firmware module. The search can begin at a memory address specified by the IP at the time the error condition occurred at the computing device.

Once the memory address containing the signature has been identified, a firmware module that includes the function that generated the error condition can be identified based on the memory address containing the signature. The name of the function that generated the error condition can then be identified using a function mapping file. The function mapping file includes data defining a memory address for each of the functions in the firmware module and data identifying the name of each of the functions in the firmware module. The function mapping file can be generated at build time of the firmware module.

Once the function that caused the error condition has been identified, previous functions in the same call chain can be identified using various data sources including, but not limited to, unwind data or stack frames. The names of the other functions in the call chain can be identified using the function mapping file. Output can then be generated by the computing system that specifies the name of the firmware module that includes the function that generated the error condition, the name of the function that generated the error condition, and the names of other functions in the same call chain.

It should be appreciated that the above-described subject matter can also be implemented as a computer-controlled apparatus, a computer process, a computing system, or as an article of manufacture such as a computer-readable medium. These and various other features will be apparent from a reading of the following Detailed Description and a review of the associated drawings.

This Summary is provided to introduce a selection of the technologies disclosed herein in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is

DETAILED DESCRIPTION

The following detailed description is directed to technologies for identifying firmware functions that were executed in a call chain prior to the occurrence of an error condition, such as an assert or an exception. As discussed briefly above, implementations of the disclosed technologies can enable firmware developers to create more reliable and performant firmware by addressing the root sources of errors in firmware functions. More reliable firmware can reduce the number of system failures, and might also save computing resources such as, but not limited to, processor cycles, memory, network bandwidth, and storage. Technical benefits other than those specifically mentioned herein can also be realized through implementations of the disclosed technologies.

It is to be appreciated that the subject matter presented herein can be implemented as a computer process, a computer-controlled apparatus, a computing system, or an article of manufacture, such as a computer-readable storage medium. While the subject matter described herein is presented in the general context of program modules that execute on one or more computing devices, those skilled in the art will recognize that other implementations can be performed in combination with other types of program modules. Generally, program modules include routines, programs, components, data structures, and other types of structures that perform particular tasks or implement particular abstract data types.

Those skilled in the art will also appreciate that aspects of the subject matter described herein can be practiced on or in conjunction with other computer system configurations beyond those described herein, including multiprocessor systems, microprocessor-based or programmable consumer electronics, minicomputers, mainframe computers, handheld computers, personal digital assistants, e-readers, mobile telephone devices, tablet computing devices, special-purposed hardware devices, network appliances, and the like. The configurations described herein can be practiced in distributed computing environments, where tasks can be performed by remote computing devices that are linked through a communications network. In a distributed computing environment, program modules can be located in both local and remote memory storage devices.

In the following detailed description, references are made to the accompanying drawings that form a part hereof, and that show, by way of illustration, specific configurations or examples. The drawings herein are not drawn to scale. Like numerals represent like elements throughout the several figures (which might be referred to herein as a "FIG." or "FIGS.").

Figure 1:
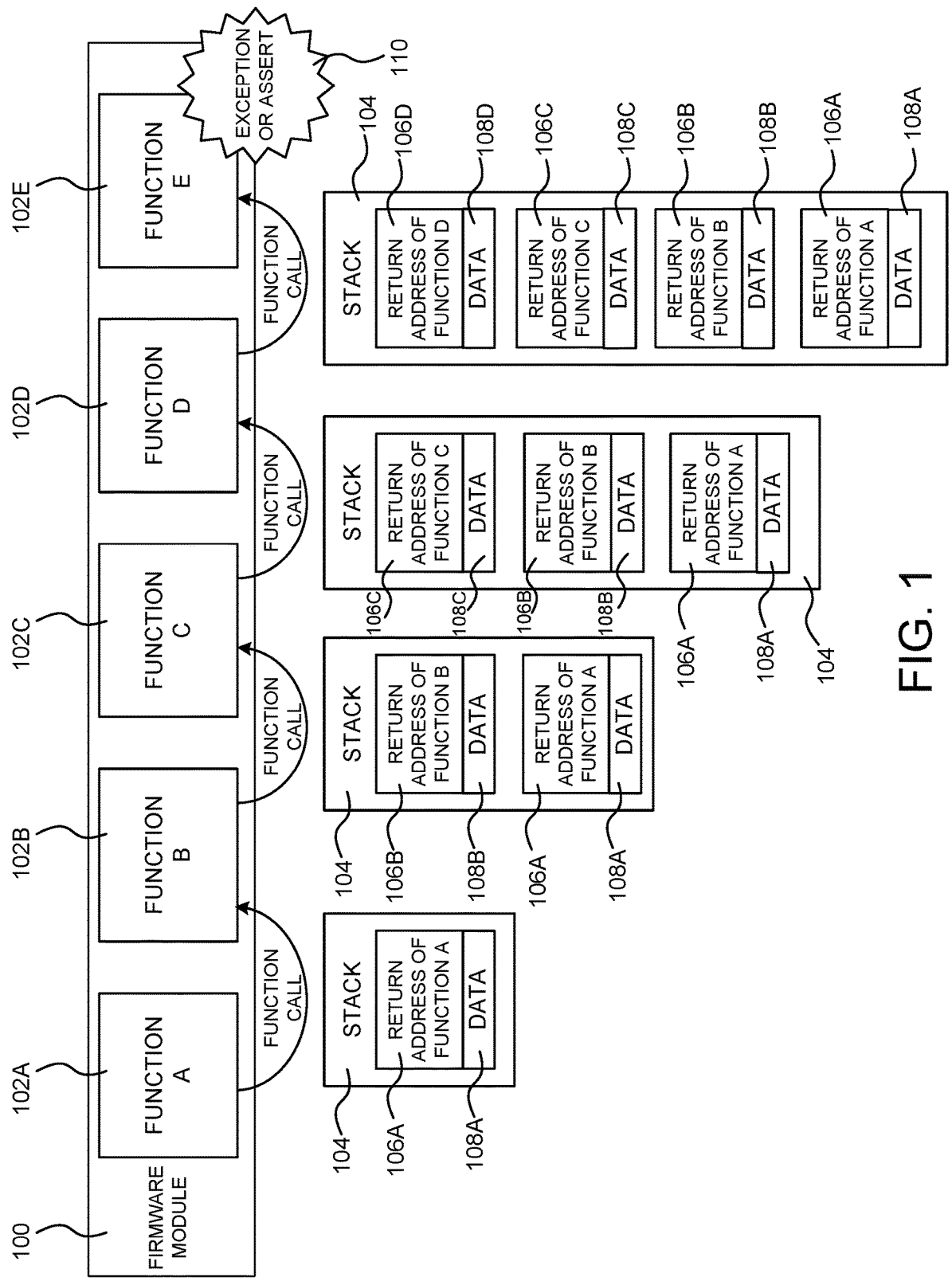
FIG. 1 is a call chain diagram showing the contents of a stack during a series of function calls in an illustrative call chain.

FIG. 1 is a call chain diagram showing the contents of a stack during a series of function calls in an illustrative call chain. As illustrated in FIG. 1, a firmware module 100 contained in a computing system firmware (not shown in FIG. 1), can include a number of functions 102A-102E (which might be referred to collectively as the "functions 102"). As also shown in FIG. 1, the functions 102 can perform function calls to one another. Although not illustrated in FIG. 1, the functions 102 can also call other functions 102 in other firmware modules 100.

Each time a function call is performed, the calling function places data on a stack 104. For instance, in the example shown in FIG. 1, the function 102A has placed its return address 106A and data 108A on the stack 104 just prior to calling the function 102B. Similarly, the function 102B has placed its return address 106B and data 108B on the stack 104 just prior to calling the function 102C. The function 102C has placed its return address 106C and data 108C on the stack 104 just prior to calling the function 102D. Finally, the function 102D has placed its return address 106D and data 108D on the stack 104 just prior to calling the function 102E.

The return addresses 106 placed on the stack can be utilized to return control to a calling function after the called function has completed. For instance, after the function 102E completes, the return address 106D placed on the stack 104 by the function 102D can be utilized to return control to the function 102D. This process can be repeated through the call chain in order to return control to each previous calling function 102, until control is finally returned to the function 102. The data 108 placed on the stack 104 by each function 102 can include, but is not limited to, local variables and passed parameters or values.

As discussed briefly above, the location in a computer system firmware where an error condition, such as an assert or exception, occurred is commonly not the location of the firmware code that was the root source of the error condition. For instance, in the example shown in FIG. 1, the function 102A might generate a value. A second, subsequent, function in the call chain might consume the value in an attempt to allocate memory or perform another function.

In the illustrated example, the function 102E consumes the value generated by the function 102A to perform its processing. If the value is out of bounds and therefore results in an error condition while performing the function, the location where the assert or exception occurred in the second function will be identified as the location of the error condition even though the value generated by the first function actually caused the assert or exception. In the illustrated example, for instance, the error condition 110 occurs in the function 102E although the root source of the error is actually in the function 102A.

In view of the example call chain shown in FIG. 1 and described above, it should be appreciated that it can be difficult to identify the root source of error conditions in computer system firmware. This can result in firmware code that contains errors or unoptimized code, which can cause computing systems to malfunction or otherwise negatively impact the performance of computing systems executing the firmware. The technologies disclosed herein address these and other technical considerations.

Figure 2:
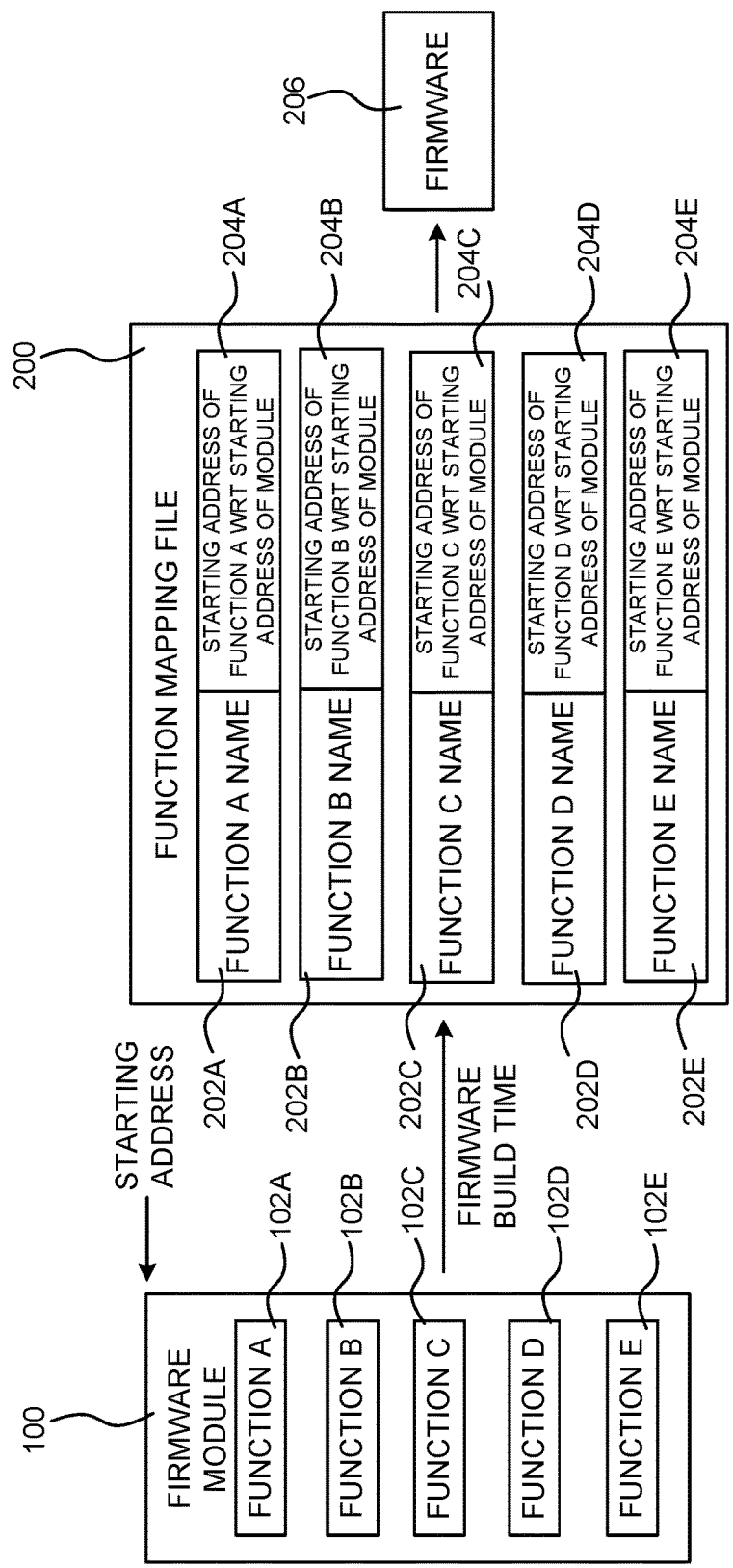
FIG. 2 is a data flow diagram illustrating aspects of the creation of an illustrative function mapping file for an illustrative firmware module.

FIG. 2 is a data flow diagram illustrating aspects of the creation of an illustrative function mapping file 200 for an illustrative firmware module 100. As illustrated in FIG. 2, a function mapping file 200 can be created during the build time of a firmware module 100. In some configurations, a software tool (not shown in FIG. 2) implemented as part of a firmware build process generates the function mapping file 200. Other components can generate the function mapping file 200 in other configurations.

As shown in FIG. 2, the function mapping file 200 includes data 202A-202E identifying the name of each function 102 in a module 100. The data 202A specifies a name of the function 102A, the data 202B specifies the name of the function 102B, the data 202C specifies the name of the function 102B, and so on.

The function mapping file 200 also includes data 204A-204E identifying the starting memory address of each function 102. The starting address of each function 102 is defined with respect to the starting memory address of the firmware module 100 that contains the function in some configurations. In the illustrated example, for instance, the data 204A specifies the starting memory address of the function 102A with respect to the starting address of the firmware module 100, the data 204B specifies the starting memory address of the function 102B with respect to the starting address of the firmware module 100, and so on.

Once the function mapping file 200 has been generated, the file 200 can be stored in the firmware 206. In one configuration, the function mapping file 200 is stored as a binary file in the firmware 206 using the firmware file system ("FFS"). The function mapping file 200 can be made available for use by the firmware 206 during all phases of firmware execution. For instance, in the case of a UEFI-Specification compliant firmware, the function mapping file 200 is made available during the Pre-EFI Initialization ("PEI") phase, the Driver Execution Environment ("DXE") phase, and other phases of firmware execution.

A function mapping file 200 is created and stored in the firmware 206 in the manner described above for all of the modules 100 in the firmware 206 in some configurations. Aspects of the use of the function mapping file 200 for identifying firmware functions 102 that were executed in a call chain prior to the occurrence of an error condition will be provided below.

Figure 3A:
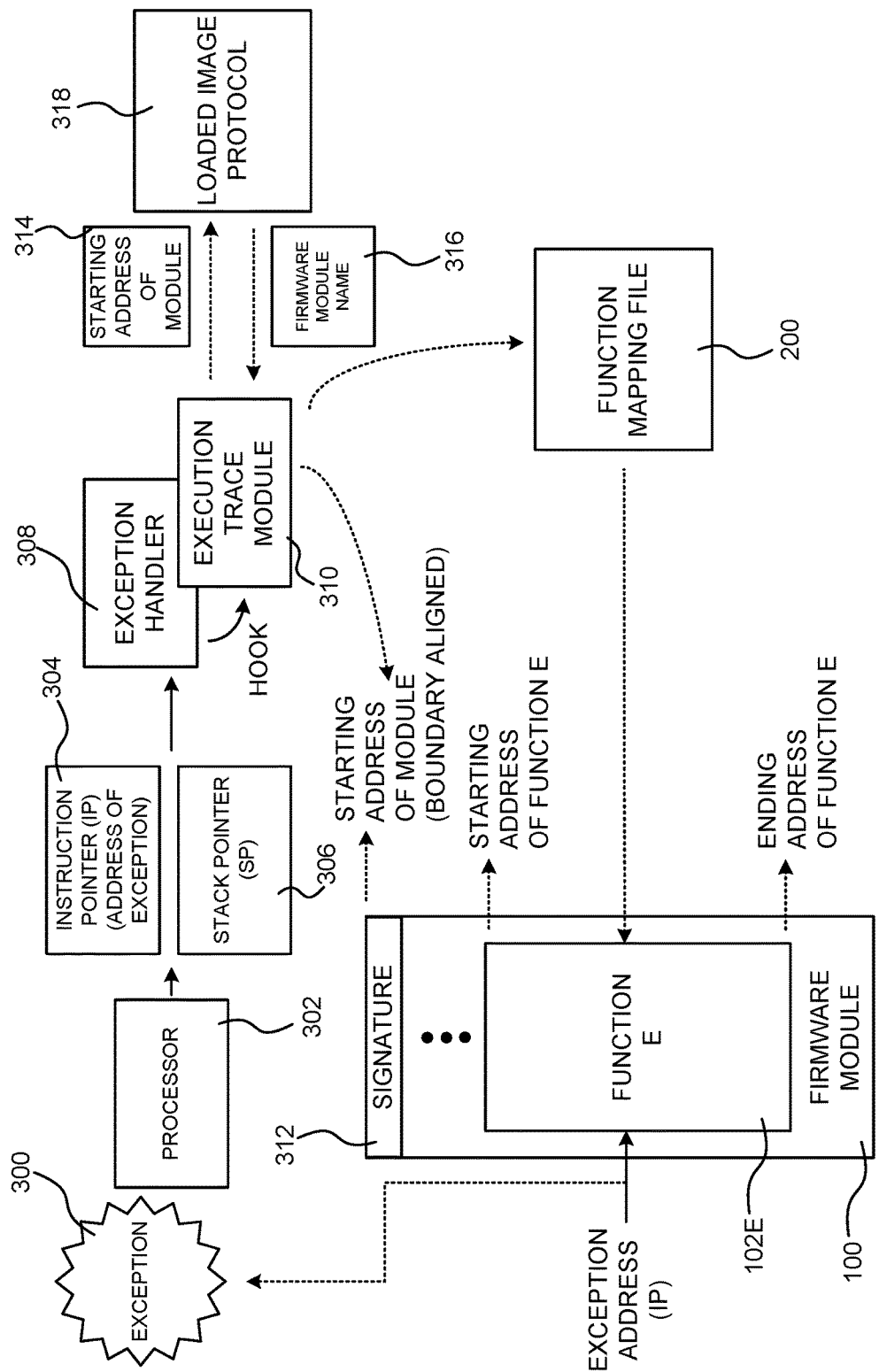
FIG. 3A is a data flow diagram illustrating aspects of one mechanism disclosed herein for identifying a function in a firmware module that caused an exception in a computing system.

FIG. 3A is a data flow diagram illustrating aspects of one mechanism disclosed herein for identifying a function 102 in a firmware module 100 that caused an exception in a computing system. In the example shown in FIG. 3A, the function 102E in the firmware module 100 has thrown an exception 300 on a computing system executing the firmware 206. In response thereto, a processor 302 in the computing system executing the firmware 206 has called an exception handler 308 that is part of the firmware 206.

In response to the occurrence of the exception 300, the processor 302 has also provided the memory address specified by the processor's instruction pointer ("IP") at the time the exception was thrown to the exception handler. As shown in FIG. 3A, the IP 304 in this example is a memory address within the function 102E. The processor 302 also provides the memory address of the processor's stack pointer ("SP") (e.g. the ESP register on INTEL X86 architectures or the RSP register on 64-bit architectures) at the time the exception was thrown to the exception handler 308. The SP may change during the execution of a function as values are pushed or popped off the stack (e.g. pushing parameters in preparation for calling another function).

In the configuration shown in FIG. 3A, an execution trace module 310 in the firmware 206 "hooks" the exception handler 308 in order to identify the function 102E that caused the exception 300. Other components, such as the exception handler 308 itself, might perform these functions in other configurations.

In order to identify the function 102E that caused the exception 300, the execution trace module 310 performs a search of the main memory of the computing system executing the firmware 206 for a signature 312 contained in the firmware module 100. The signature 312 is unique data (e.g. a GUID) whose presence indicates the starting address of a firmware module 100 in memory. In some configurations, firmware modules 100 are loaded at memory boundaries (e.g. 4K, 8K, etc.) and, therefore, the signatures 312 for the modules 100 can be found on memory boundaries. In these configurations, the search performed by the execution trace module 310 can be limited to memory locations on the appropriate boundaries.

Once the execution trace module 310 has located the starting address of the firmware module 100 containing the function 102E that caused the exception 300, the execution trace module 310 can use this address to obtain the name 316 of the firmware module 100. In configurations where the firmware 206 is a UEF Specification-compliant firmware, the execution trace module 310 can call a loaded image protocol 318 with the starting address of the firmware module 100 to obtain the identity (e.g. a handle to module 100) of the module 100, including its name 316. The loaded image protocol 318 maintains data identifying the loaded modules 100 and their starting memory addresses.

Once the execution trace module 310 has identified the particular module containing the function 102E that caused the exception 300, the execution trace module 310 can then utilize the function mapping file 200 to determine the name of the function 102E that caused the exception 300. In particular, the execution trace module 310 can determine the offset of the IP in the firmware module 100 and compare the offset to the starting addresses of the modules 102A-102E set forth in the function mapping file 200. The IP will be in the address range of the module 102E that caused the exception 300.

Once the module 102E has been identified, the execution trace module 310 can retrieve the name of the module 102E that caused the exception 300 from the function mapping file 200. The execution trace module 310, or another component, can then print the name, store the name in a file, present the name in a user interface, or otherwise make the name available to a developer of the firmware 206.

Figure 3B:
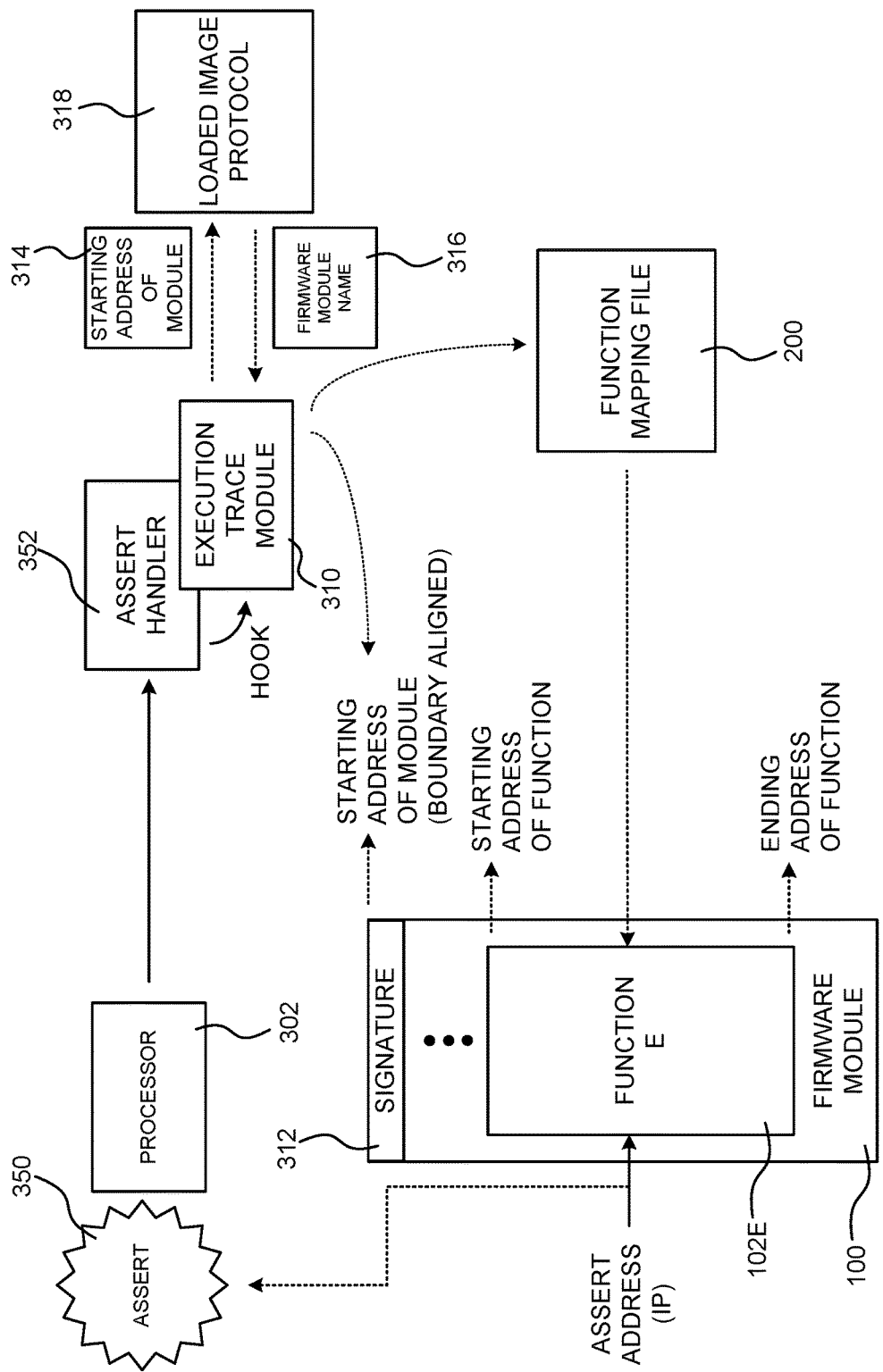
FIG. 3B is a data flow diagram illustrating aspects of one mechanism disclosed herein for identifying a function in a firmware module that caused an assert in a computing system.

FIG. 3B is a data flow diagram illustrating aspects of one mechanism disclosed herein for identifying a function 102 in a firmware module 100 that caused an assert in a computing system. In the example shown in FIG. 3B, the function 102E in the firmware module 100 has caused an assert 350 on a computing system executing the firmware 206. In response thereto, a processor 302 in the computing system executing the firmware 206 has called an assert handler 352 that is part of the firmware 206.

In the configuration shown in FIG. 3A, the execution trace module 310 in the firmware 206 "hooks" the assert handler 352 in order to identify the function 102E that generated the assert 350. Other components, such as the assert handler 352 itself, might perform these functions in other configurations.

In order to identify the function 102E that caused the assert 350, the execution trace module 310 first determines the IP and SP at the time the assert 350 occurred. The execution trace module 310 then performs a search of the main memory of the computing system executing the firmware 206 for a signature 312 contained in the firmware module 100. As discussed above, the signature 312 is unique data (e.g. a GUID) that indicates the starting address of a firmware module 100 in memory. Because the signatures 312 of the modules 100 can be found on memory boundaries, the search performed by the execution trace module 310 can be limited to memory locations on the appropriate boundaries in some configurations.

Once the execution trace module 310 has located the starting address of the firmware module 100 containing the function 102E that caused the assert 350, the execution trace module 310 can use this address to obtain the name 316 of the firmware module 100. In configurations where the firmware 206 is a UEF Specification-compliant firmware, the execution trace module 310 can call the loaded image protocol 318 with the starting address of the firmware module 100 to obtain the identity (e.g. a handle to module 100) of the module 100, including its name 316.

Once the execution trace module 310 has identified the particular module containing the function 102E that caused the assert 350, the execution trace module 310 can then utilize the function mapping file 200 to determine the name of the function 102E that caused the assert 350. In particular, the execution trace module 310 can determine the offset of the IP in the firmware module 100 and compare the offset to the starting addresses of the modules 102A-102E set forth in the function mapping file 200. The IP will be in the address range of the module 102E that caused the assert 350.

Once the module 102E has been identified, the execution trace module 310 can retrieve the name of the module 102E that caused the assert 350 from the function mapping file 200. The execution trace module 310, or another component, can then print the name, store the name in a file, present the name in a user interface, or otherwise make the name available to a developer of the firmware 206.

Figure 4:
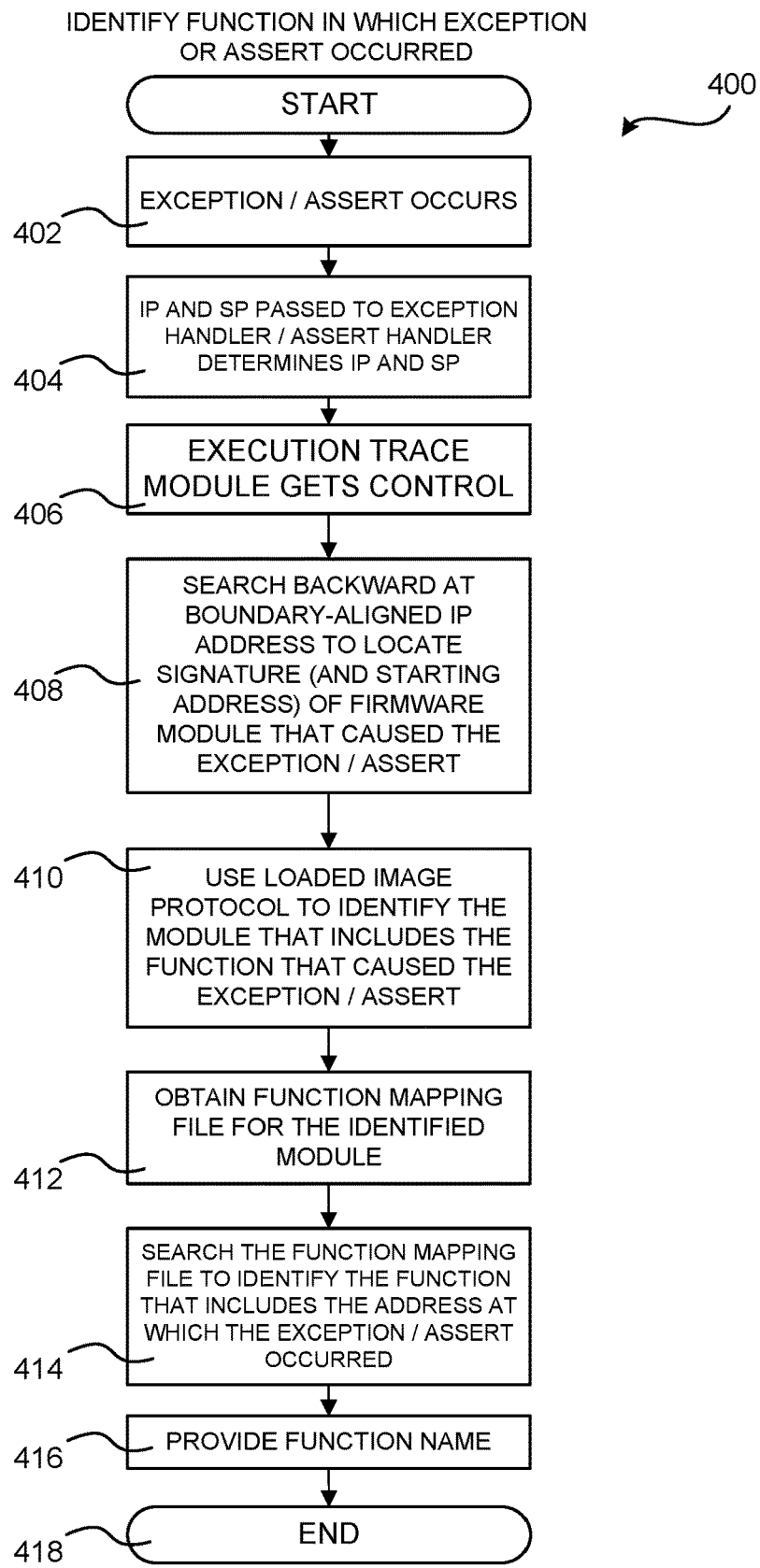
FIG. 4 is a flow diagram showing a routine that illustrates aspects of an illustrative method for identifying a function in a firmware module that caused an error condition in a computing system, according to one embodiment presented herein.

FIG. 4 is a flow diagram showing a routine 400 that illustrates aspects of an illustrative method for identifying a function 102 in a firmware module 100 that caused an error condition in a computing system, according to one embodiment presented herein. It is to be appreciated that the logical operations described herein with respect to FIG. 4, and the other FIGS., can be implemented (1) as a sequence of computer implemented acts or program modules running on a computing system and/or (2) as interconnected machine logic circuits or circuit modules within the computing system.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, and any combination thereof. It should also be appreciated that more or fewer operations might be performed than shown in the FIGS. and described herein. These operations can also be performed in parallel, or in a different order than those described herein. These operations can also be performed by components other than those specifically identified.

The routine 400 begins at operation 402, where an error condition, such as an exception 300 or an assert 350, occurs. The routine 400 then proceeds from operation 402 to operation 404, where the exception handler 308 or the assert handler 352, as appropriate, obtains the IP an SP at the time the exception 300 or assert 350 occurred. The routine 400 then proceeds from operation 404 to operation 406.

At operation 406, control is then passed from the exception handler 308 or the assert handler 352 to the execution trace module 310. The routine 400 then proceeds from operation 406 to operation 408, where the execution trace module 310 searches for a signature of the module 100 containing the function 102 that caused the exception 300 or assert 350. As discussed above, the search can be performed backward from the memory location specified by the IP and on memory boundaries in some configurations. In this way, the execution trace module 310 can located the starting memory address of the module 100 containing the function 102 that cased the exception 300 or assert 350.

From operation 408, the routine 400 proceeds to operation 410, where the execution trace module 310 uses the loaded image protocol 318 to determine the name of the module 100 containing the function 102 that caused the exception 300 or assert 350. The routine 400 then proceeds from operation 410 to operation 412.

At operation 412, the execution trace module 310 obtains the function mapping file 200 for the module 100 containing the function 102 that caused the exception 300 or assert 350. The routine 400 then proceeds from operation 412 to operation 414, where the execution trace module 310 searches the function mapping file 200 for the function 102 that includes the memory address (i.e. the IP) where the exception 300 or assert 350 occurred.

The routine 400 then proceeds from operation 414 to operation 416, where the execution trace module 310, or another component, can then print the name, store the name in a file, present the name in a user interface, or otherwise make the name available to a developer of the firmware 206. The routine 400 then proceeds from operation 416 to operation 418, where it ends.

Once the function 102 that caused the error condition 110 and the module 100 that contains the function 102 have been identified, the other functions 102 in the call chain can be identified. In the example shown in FIG. 1, for instance, the function 102E caused the error condition 110 is first identified. Then, the other functions 102A-102D previous to the function 102E in the same call chain are identified. Data can then be output that identifies the module 100 and the functions 102A-102E in the call chain that includes the function 102E that caused the error condition. Details regarding several mechanisms for identifying the previous functions in a call chain are provided below with regard to FIGS. 5-8.

Figure 5:
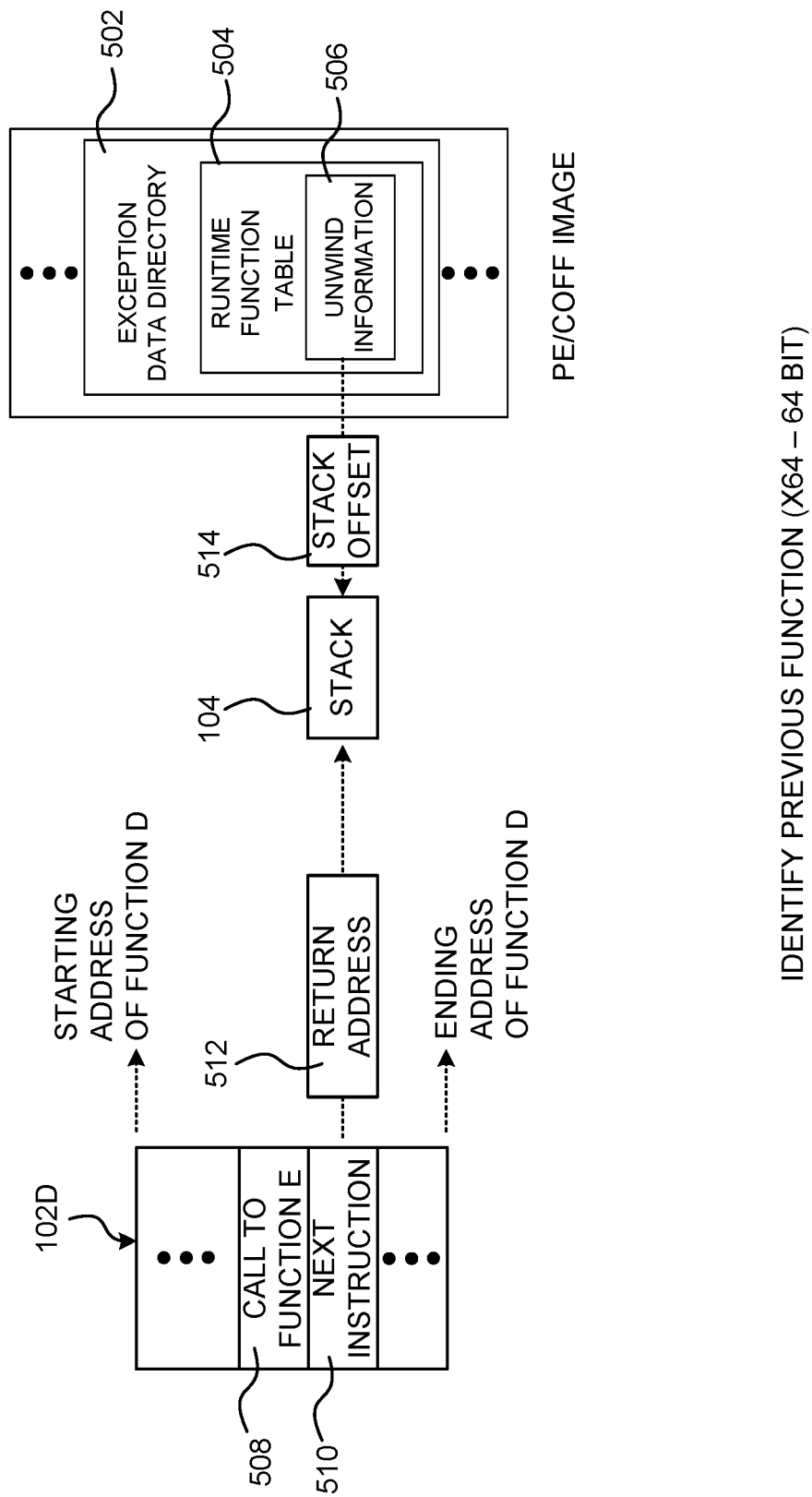
FIG. 5 is a data structure diagram illustrating aspects of one mechanism disclosed herein for obtaining an instruction pointer and a stack pointer for a previous function in a call chain, according to one embodiment disclosed herein.

FIG. 5 is a data structure diagram illustrating aspects of one mechanism disclosed herein for obtaining an IP and an SP for a previous function 102 in a call chain, according to one embodiment disclosed herein. The mechanism illustrated in FIG. 5 is suitable for determining an IP and an SP for a previous function 102 in a computing system having an x64 64-bit architecture. A mechanism for determining an IP and an SP for a previous function 102 in a computing system having an x86 32-bit architecture will be described below with regard to FIGS. 7 and 8.

As shown in FIG. 5, a return address 512 of a function 102 is pushed on the stack 104 when the function calls another function. In this example, the address 510 of the next instruction of the function 102D following the address 508 containing the call to the function 102E is the return address 512 for the function 102D. Accordingly, the address 510 of the next instruction is pushed onto the stack 104 when the call to the function 102E is made.

In order to identify a previous function that called a current function (e.g. the function 102E that caused an error condition 110 or another function 102 in the same call chain), the return address 512 of the previous function is identified. As discussed above, the return address 512 of the previous function is pushed onto the stack 104 when the current function is called. In the configuration shown in FIG. 5, unwind information 506 is utilized to calculate a stack offset 514 into the stack 104 to obtain the return address 512 of the previous function (i.e. the function 102D in the illustrated example). The unwind information 506 can also be utilized to obtain the SP for the previous function. The unwind information 506 is contained in images built for an x64 architecture that follow the MICROSOFT PE/COFF specification.

As shown in FIG. 5, an image formatted according to the PE/COFF specification includes an exception data directory 502 and a runtime function table 504 that includes the unwind information 506 for the current function. The unwind information 506 is a data structure that stores data describing the effects a function has on the stack pointer, and where the nonvolatile registers of the CPU are saved on the stack 104. Along with other structure members, the unwind information 506 structure contains a count of unwind codes (not shown in FIG. 5) and an unwind code array (also not shown in FIG. 5). The count of the unwind codes provides the size of the unwind code array.

The unwind code array contains data recording the sequence of operations in a prolog that affects the nonvolatile registers of the CPU and the SP. In other words, it explains how the SP gets modified during a function call. Along with other structure members, the unwind code array contains unwind operation code (not shown in FIG. 5) and operation information (also not shown in FIG. 5). The stack offset 512 to obtain the return address 512 of a previous function is calculated by combining the unwind operation code and operation info. After identifying the correct stack offset 514, the return address 512 of the previous function is extracted by reading the value in the stack 104 located at the stack offset 514. The return address 512 is the IP for the previous function 102 in the call chain.

Along with return address, the SP for the previous function is also identified for use in performing a back trace to the next previous function (i.e. the function that called the previous function in the call chain). The previous SP is identified by reading from the location specified by the stack offset 514 after adjustment (i.e. adding the size of the return address 512 (4 bytes for x86 architectures and 8 bytes for x64 architectures) to the stack offset 104).

Once the IP and SP of the previous function 102 in the call chain have been identified, the process described above with regard to FIGS. 1-4 can be repeated in order to determine the name of the previous function. This process can then be repeated for other previous functions 102 in the call chain in order to determine the names of all of the functions in the call chain. Output can then be generated by the firmware 206 that specifies the name of the firmware module 100 that includes the function (e.g. the function 102E) that generated the error condition, the name of the function that generated the error condition, and the names of other functions (e.g. the functions 102A-102E in the illustrated example) in the same call chain. Additional details regarding this process will be provided below with regard to FIG. 6.

Figure 6:
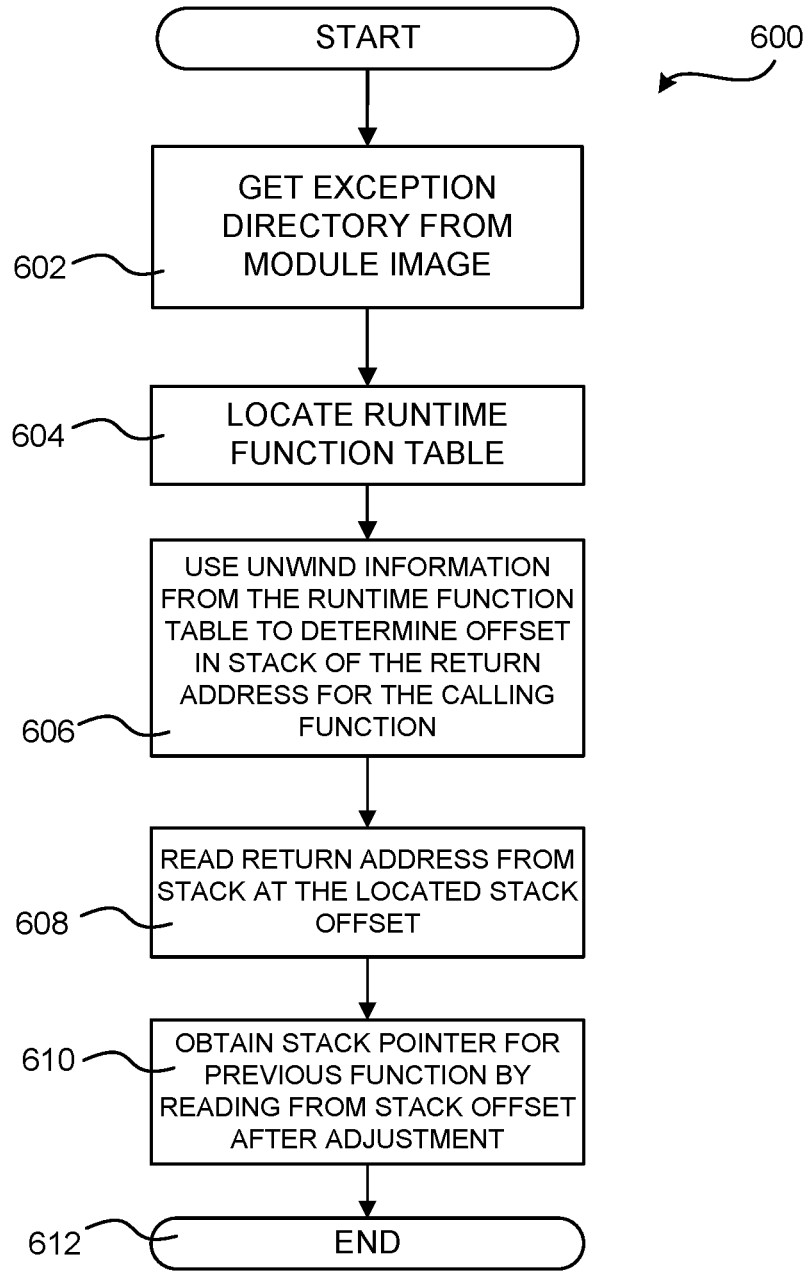
FIG. 6 a flow diagram illustrating aspects of the mechanism shown in FIG. 5 for obtaining an instruction pointer and a stack pointer for a previous function in a call chain, according to one embodiment disclosed herein.

FIG. 6 a flow diagram showing a routine 600 that illustrates aspects of the mechanism shown in FIG. 5 for obtaining an IP and an SP for a previous function 102 in a call chain in a computing system having an x64 64-bit architecture, according to one embodiment disclosed herein. The routine 600 begins at operation 602, where the exception data directory 502 is obtained from a PE/COFF image for the current function 102. At operation 604, the runtime function table 504 for the current function 102 is obtained from the exception data directory 502. The routine 600 then proceeds from operation 604 to operation 606.

At operation 606, the unwind information 506 from the runtime function table 504 is used in the manner described above to determine an offset 514 into the stack of a previous function (i.e. the function that called the current function). The routine 600 then proceeds to operation 608, where the return address 512 (i.e. the IP) of the previous function 102 is read from the stack 104 at the location determined by the stack offset 514. The routine 600 then proceeds from operation 608 to operation 610, where the SP for the previous function is obtained by reading from the location specified by the stack offset 514 after adjustment. The routine 600 then proceeds from operation 610 to operation 612, where it ends.

Once the IP and SP of the previous function 102 in the call chain have been identified as illustrated in FIG. 6, the process described above with regard to FIGS. 1-4 can be repeated in order to determine the name of the previous function. This process (i.e. the process described with reference to FIGS. 1-6) can then be repeated for other previous functions 102 in the call chain in order to determine the names of all of the functions in the call chain. Output can then be generated by the firmware 206 that specifies the name of the firmware module 100 that includes the function (e.g. the function 102E) that generated the error condition, the name of the function that generated the error condition, and the names of other functions (e.g. the functions 102A-102E in the illustrated example) in the same call chain. Other types of data can be output in other configurations.

Figure 7:
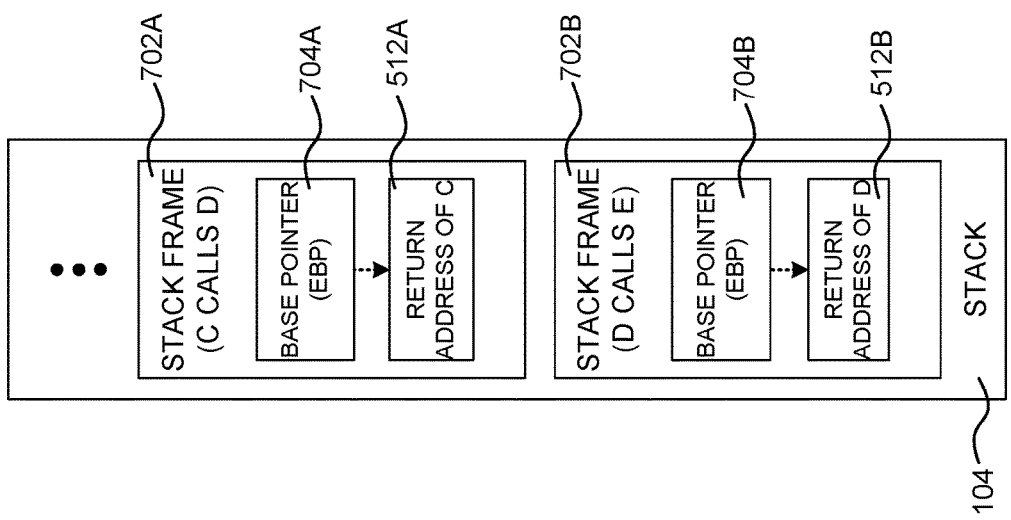
FIG. 7 is a data structure diagram illustrating aspects of another mechanism for obtaining an instruction pointer and a stack pointer for a previous function in a call chain, according to one embodiment disclosed herein.

FIG. 7 is a data structure diagram illustrating aspects of another mechanism for obtaining an instruction pointer and a stack pointer for a previous function in a call chain a call chain in a computing system having an x86 32-bit architecture, according to one embodiment disclosed herein. As shown in FIG. 7, a stack frame 702 is created when a function 102 is called to support the function's execution. The stack frame contains can include incoming parameters, local variables, and, potentially, temporary variables. A stack frame 702 also typically contains a return address, input parameters, local variables of the function, and register contents. The example shown in FIG. 7 illustrates partial contents of the stack frame 702A created when the function 102C calls the function 102D and the stack frame 702B created when the function 102D calls the function 102E.

As also shown in FIG. 7, the stack frames 702 can also include the contents of the CPU's base pointer register ("EBP") when the function call is made. The EBP includes a memory address pointing to a location in the stack frame 702 for the corresponding function 102. For example, the stack frame 702A includes the EBP 704A for the function 102C and the stack frame 702B includes the EBP 704B of the function 102E. Each item in the stack 104 can be addressed as an offset of the EBP.

The EBP is used to obtain the SP that points to the return address 512 of the previous function. The EBP 704A can be utilized to obtain the return address 512A of the function 102C and the EBP 704B can be utilized to obtain the return address 512B of the function 102D.

As in the example described above with regard to FIGS. 5 and 6, once the IP and SP of the previous function 102 in the call chain have been identified, the process described above with regard to FIGS. 1-4 can be repeated in order to determine the name of the previous function. This process can then be repeated for other previous functions 102 in the call chain in order to determine the names of all of the functions in the call chain. Output can then be generated by the firmware 206 that specifies the name of the firmware module 100 that includes the function (e.g. the function 102E) that generated the error condition, the name of the function that generated the error condition, and the names of other functions (e.g. the functions 102A-102E in the illustrated example) in the same call chain. Additional details regarding this process will be provided below with regard to FIG. 8.

Figure 8:
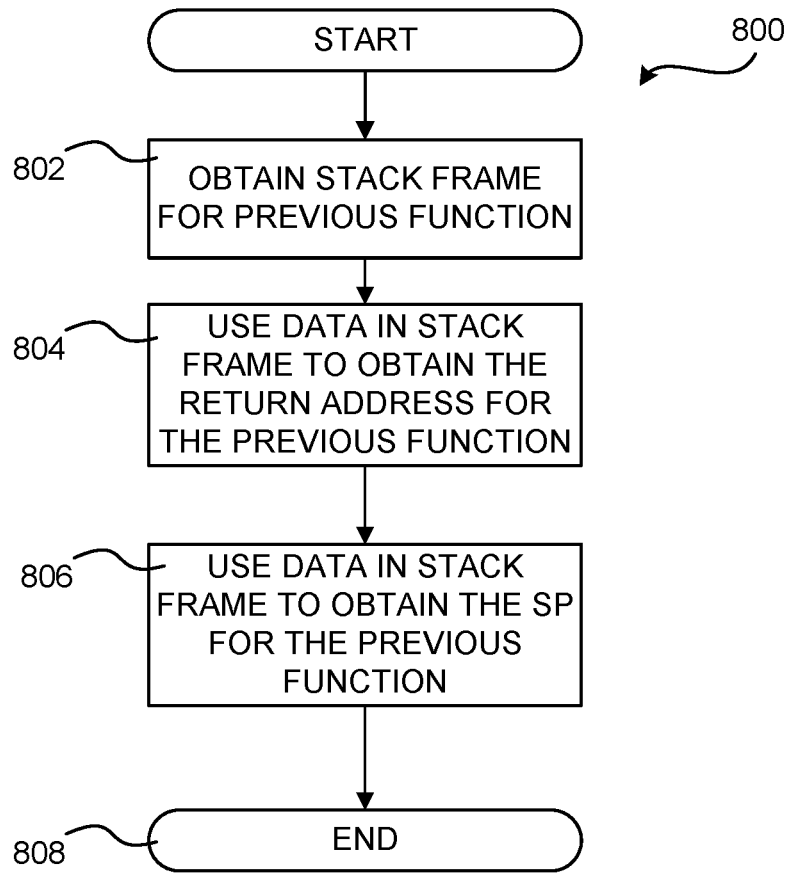
FIG. 8 is a flow diagram illustrating aspects of the mechanism shown in FIG. 7 for obtaining an instruction pointer and a stack pointer for a previous function in a call chain, according to one embodiment disclosed herein.

FIG. 8 is a flow diagram showing a routine 800 that illustrates aspects of the mechanism shown in FIG. 7 for obtaining an IP an SP for a previous function in a call chain, according to one embodiment disclosed herein. The routine 800 begins at operation 802, where the stack frame 702 for the previous function 102 is identified. The routine 700 then proceeds from operation 802 to operation 804, where data in the stack frame 702 is used to obtain the return address for the previous function in the manner described above. The routine 700 then proceeds to operation 806, where the data in the stack frame 702 is used to obtain the SP for the previous function. The routine 800 then proceeds from operation 806 to operation 808, where it ends.

Figure 9:
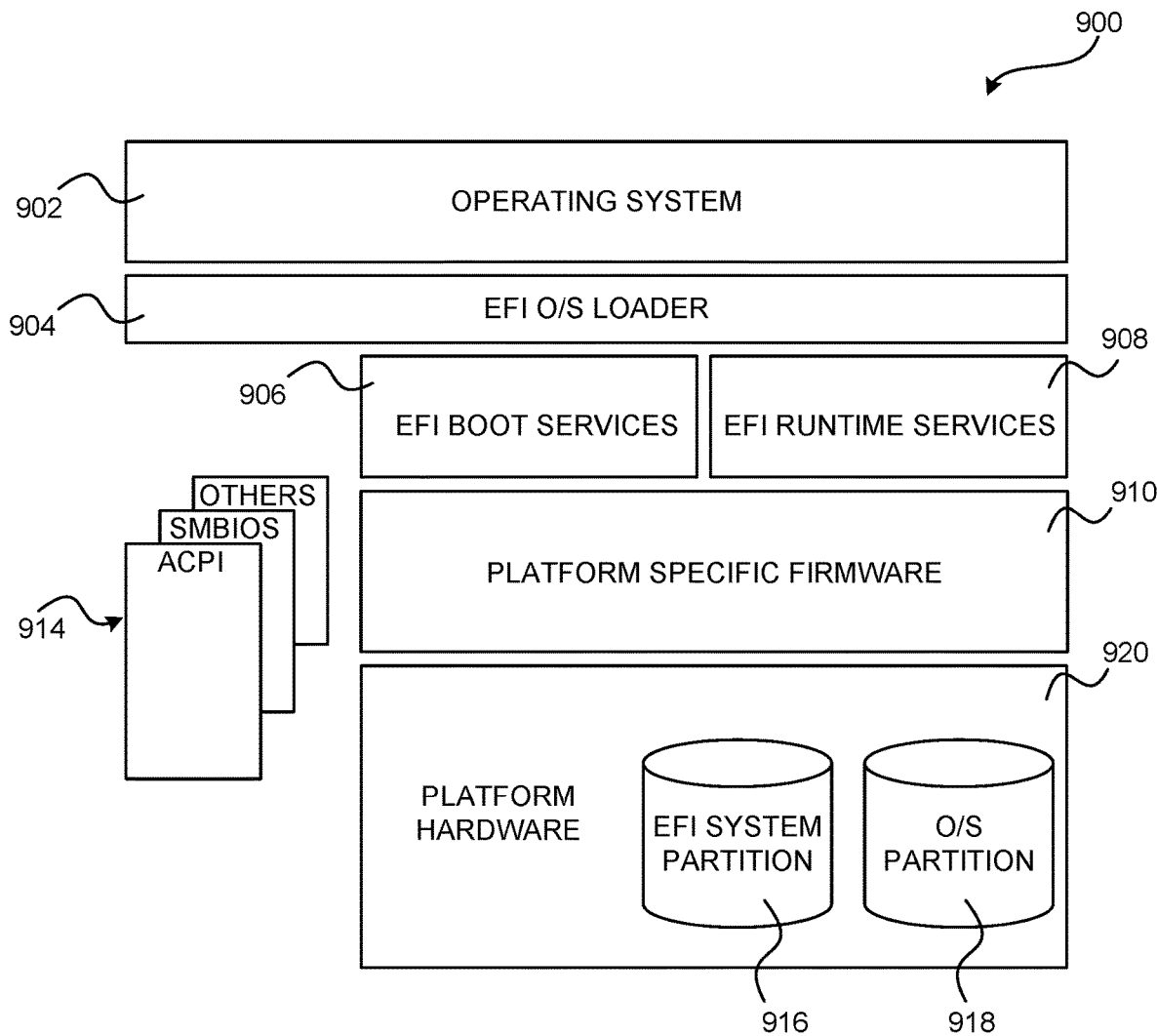
FIG. 9 is a software architecture diagram illustrating a software architecture for a unified extensible firmware interface ("UEFI")-compliant firmware that provides an operating environment for aspects of the technologies presented herein in one embodiment.

Turning now to FIG. 9, a software architecture diagram will be described that illustrates an architecture for a UEFI Specification-compliant firmware 900 that can be configured to provide and/or utilize aspects of the technologies disclosed herein. In particular, the firmware architecture shown in FIG. 9 can be utilized to implement the firmware modules described above. The firmware 900 can also be implemented in other ways in other configurations. The architecture shown in FIG. 9 can be utilized to implement the firmware 206 described above.

The UEFI Specification describes an interface between an operating system 902 and a UEFI Specification-compliant firmware 900. The UEFI Specification also defines an interface that a firmware 900 can implement, and an interface that an operating system ("OS") 902 can use while booting. How a firmware implements the interface can be left up to the manufacturer of the firmware. The UEFI Specification also defines a way for an operating system 902 and a firmware 900 to exchange information necessary to support the operating system boot process. The term "UEFI Specification" used herein refers to the EFI Specification developed by INTEL CORPORATION, the UEFI Specification managed by the UEFI FORUM, and other related specifications available from the UEFI FORUM.

As shown in FIG. 9, the architecture can include platform hardware 920, such as that described below with regard to FIG. 10, and an operating system 902. A boot loader 904 for the operating system 902 can be retrieved from the UEFI system partition 916 using a UEFI operating system loader 904. The UEFI system partition 916 can be an architecturally shareable system partition. As such, the UEFI system partition 916 can define a partition and file system designed to support safe sharing of mass storage between multiple vendors. An OS partition 918 can also be utilized.

Once started, the UEFI OS loader 904 can continue to boot the complete operating system 902. In doing so, the UEFI OS loader 904 can use UEFI boot services 906, an interface to other supported specifications to survey, comprehend, and initialize the various platform components and the operating system software that manages them. Thus, interfaces 914 from other specifications can also be present on the system. For example, the Advanced Configuration and Power Management Interface ("ACPI") and the System Management BIOS ("SMBIOS") specifications can be supported.

UEFI boot services 906 can provide interfaces for devices and system functionality used during boot time. UEFI runtime services 908 can also be available to the UEFI OS loader 904 during the boot phase. UEFI allows extension of platform firmware by loading UEFI driver and UEFI application images which, when loaded, have access to UEFI-defined runtime and boot services.

Additional details regarding the operation and architecture of a UEFI Specification-compliant firmware can be found in the UEFI Specification which is available from the UEFI Forum. INTEL CORPORATION has also provided further details regarding recommended implementation of EFI and UEFI in the form of The INTEL Platform Innovation Framework for EFI ("the Framework"). Unlike the UEFI Specification, which focuses on programmatic interfaces for the interactions between the operating system 902 and system firmware 900, the Framework is a group of specifications that together describe a firmware implementation that has been designed to perform the full range of operations that are required to initialize a platform from power on through transfer of control to the operating system 902. The specifications that make up the Framework, which are also available from INTEL CORPORATION, are also expressly incorporated herein by reference.

Figure 10:
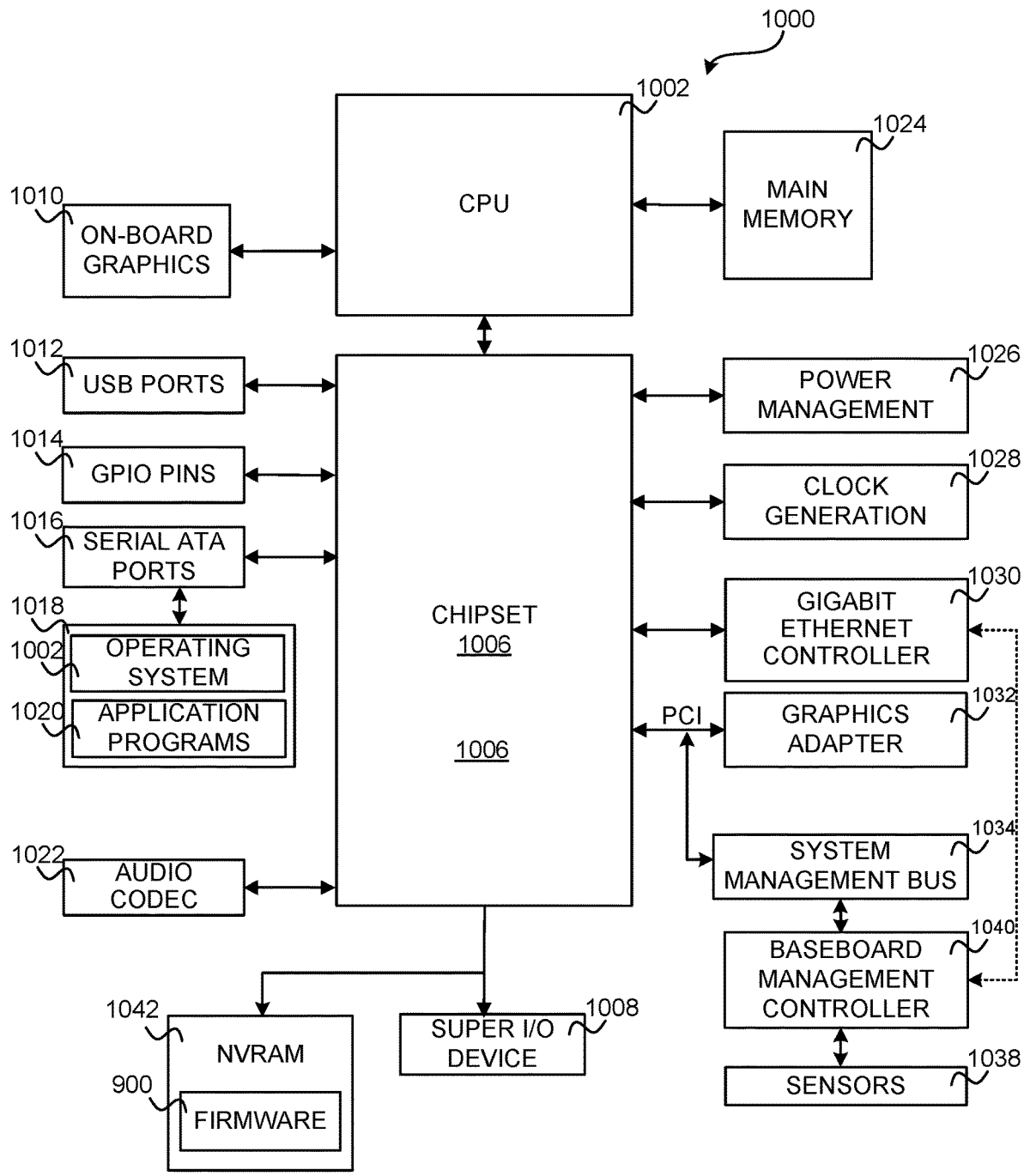
FIG. 10 is a computer architecture diagram that shows an illustrative architecture for a computer that can implement the technologies disclosed herein.

Referring now to FIG. 10, a computer architecture diagram that shows an illustrative architecture for a computer that can provide an operating environment for the technologies presented herein will be described. FIG. 10 and the following discussion are intended to provide a brief, general description of a suitable computing environment in which the configurations described herein can be implemented. While the technical details are presented herein in the general context of program modules that execute in conjunction with the execution of a firmware 900, those skilled in the art will recognize that the configurations can also be implemented in combination with other program modules.

Generally, program modules include routines, programs, components, data structures, and other types of structures that perform particular tasks or implement particular abstract data types. Moreover, those skilled in the art will appreciate that the configurations described herein can be practiced with other computer system configurations, including handheld devices, multiprocessor systems, microprocessor-based or programmable consumer electronics, minicomputers, mainframe computers, and the like. The configurations described herein can also be practiced in distributed computing environments where tasks are performed by remote processing devices that are linked through a communications network. In a distributed computing environment, program modules can be located in both local and remote memory storage devices.

In particular, FIG. 10 shows an illustrative computer architecture for a computer 1000 that can implement the technologies described herein. The illustrative computer architecture shown in FIG. 10 includes a baseboard, or "motherboard", which is a printed circuit board to which a multitude of components or devices can be connected by way of a system bus or other electrical communication path. In one illustrative configuration, a central processing unit ("CPU") 1002 operates in conjunction with a chipset 1006. The CPU 1002 is a central processor that performs arithmetic and logical operations necessary for the operation of the computer 1000. The computer 1000 can include a multitude of CPUs 1002. Each CPU 1002 might include multiple processing cores.

The CPU 1002 provides an interface to a random access memory ("RAM") used as the main memory 1024 in the computer 1000 and, possibly, to an on-board graphics adapter 1010. The chipset 1006 provides an interface between the CPU 1002 and the remainder of the computer 1000.

The chipset 1006 can also be responsible for controlling many of the input/output functions of the computer 1000. In particular, the chipset 1006 can provide one or more universal serial bus ("USB") ports 1012, an audio codec 1022, a Gigabit Ethernet Controller 1032, and one or more general purpose input/output ("GPIO") pins 1014. The USB ports 1012 can include USB 2.0 ports, USB 3.0 ports and USB 3.1 ports among other USB ports. The audio codec 1022 can include Intel High Definition Audio, Audio Codec '97 ("AC '97") and Dolby TrueHD among others.

The chipset 1006 can also include functionality for providing networking functionality through a Gigabit Ethernet Controller 1030. The Gigabit Ethernet Controller 1030 is capable of connecting the computer 1000 to another computer via a network. Connections which can be made by the Gigabit Ethernet Controller 1030 can include LAN or WAN connections. LAN and WAN networking environments are commonplace in offices, enterprise-wide computer networks, intranets, and the Internet.

The chipset 1006 can also provide a bus for interfacing peripheral card devices such as a graphics adapter 1032. In one configuration, the bus comprises a PCI bus. The PCI bus can include a Peripheral Component Interconnect ("PCI") bus, a Peripheral Component Interconnect eXtended ("PCI-X") bus and a Peripheral Component Interconnect Express ("PCIe") bus among others.

The chipset 1006 can also provide a system management bus 1034 for use in managing the various components of the computer 1000. Additional details regarding the operation of the system management bus 1034 and its connected components are provided below. Power management circuitry 1026 and clock generation circuitry 1028 can also be utilized during the operation of the chipset 1006.

The chipset 1006 is also configured to provide one or more interfaces for connecting mass storage devices to the computer 1000. For instance, according to one configuration, the chipset 1006 includes a serial advanced technology attachment ("SATA") adapter for providing one or more serial ATA ports 1016. The serial ATA ports 1016 can be connected to one or more mass storage devices storing an OS, such as OS 902 and application programs 1020, such as a SATA disk drive 1018. As known to those skilled in the art, an OS 902 comprises a set of programs that control operations of a computer and allocation of resources. An application program is software that runs on top of the operating system 902, or other runtime environment, and uses computer resources to perform application specific tasks desired by the user.

According to one configuration, the OS 902 comprises the LINUX operating system. According to another configuration, the OS 902 comprises the WINDOWS operating system from MICROSOFT CORPORATION. According to another configuration, the OS 902 comprises the UNIX operating system or one of its variants. It should be appreciated that other operating systems can also be utilized.

The mass storage devices connected to the chipset 1006, and their associated computer-readable storage media, provide non-volatile storage for the computer 1000. Although the description of computer-readable storage media contained herein refers to a mass storage device, such as a hard disk or CD-ROM drive, it should be appreciated by those skilled in the art that computer-readable storage media can be any available media that can be accessed by the computer 1000.

By way of example, and not limitation, computer-readable storage media can comprise computer storage media and communication media. Computer storage media includes volatile and non-volatile, removable and non-removable media implemented in any method or technology for storage of information such as computer-readable instructions, data structures, program modules or other data. However, computer-readable storage media does not encompass transitory signals. Computer storage media includes, but is not limited to, RAM, ROM, EPROM, EEPROM, flash memory or other solid state memory technology, CD-ROM, DVD, HD-DVD, BLU-RAY, or other optical storage, magnetic cassettes, magnetic tape, magnetic disk storage or other magnetic storage devices, or any other medium which can be used to store the desired information, and which can be accessed by the computer 1000.

A low pin count ("LPC") interface can also be provided by the chipset 1006 for connecting a Super I/O device 1008. The Super I/O device 1008 is responsible for providing a number of input/output ports, including a keyboard port, a mouse port, a serial interface, a parallel port, and other types of input/output ports. The LPC interface can also connect a computer storage media such as a ROM or a flash memory such as a NVRAM 1042 for storing firmware 900 that includes program code containing the basic routines that help to start up the computer 1000 and to transfer information between elements within the computer 1000 as discussed above.

It should be appreciated that the program modules disclosed herein, including the firmware 900, can include software instructions that, when loaded into the CPU 1002 and executed, transform a general-purpose computer 1000 into a special-purpose computer 1000 customized to facilitate all, or part of, the operations disclosed herein. As detailed throughout this description, the program modules can provide various tools or techniques by which the computer 1000 can participate within the overall systems or operating environments using the components, logic flows, and/or data structures discussed herein.

The CPU 1002 can be constructed from any number of transistors or other circuit elements, which can individually or collectively assume any number of states. More specifically, the CPU 1002 can operate as a state machine or finite-state machine. Such a machine can be transformed to a second machine, or a specific machine, by loading executable instructions contained within the program modules. These computer-executable instructions can transform the CPU 1002 by specifying how the CPU 1002 transitions between states, thereby transforming the transistors or other circuit elements constituting the CPU 1002 from a first machine to a second machine, wherein the second machine can be specifically configured to perform the operations disclosed herein. The states of either machine can also be transformed by receiving input from one or more user input devices, network interfaces (such as the Gigabit Ethernet Controller 1030), other peripherals, other interfaces, or one or more users or other actors. Either machine can also transform states, or various physical characteristics of various output devices such as printers, speakers, video displays, or otherwise.

Encoding the program modules can also transform the physical structure of the storage media. The specific transformation of physical structure can depend on various factors, in different implementations of this description. Examples of such factors can include but are not limited to the technology used to implement the storage media, whether the storage media are characterized as primary or secondary storage, and the like. For example, if the storage media are implemented as semiconductor-based memory, the program modules can transform the physical state of the semiconductor main memory 1024 and/or NVRAM 1042. For example, the software can transform the state of transistors, capacitors, or other discrete circuit elements constituting the semiconductor memory.

As another example, the storage media can be implemented using magnetic or optical technology such as hard drives or optical drives. In such implementations, the program modules can transform the physical state of magnetic or optical media, when the software is encoded therein. These transformations can include altering the magnetic characteristics of particular locations within given magnetic media. These transformations can also include altering the physical features or characteristics of particular locations within given optical media to change the optical characteristics of those locations. It should be appreciated that various other transformations of physical media are possible without departing from the scope and spirit of the present description.

As described above, the chipset 1006 can include a system management bus 1034. As discussed above, when utilized to implement the managed computing system 102, the system management bus 1034 can include a BMC 1040. As discussed above, the BMC 1040 is a microcontroller that monitors operation of the computer 1000. In a more specific configuration, the BMC 1040 monitors health-related aspects associated with the computer 1000, such as, but not limited to, the temperature of one or more components of the computer 1000, speed of rotational components (e.g., spindle motor, CPU fan, etc.) within the computer 1000, the voltage across or applied to one or more components within the computer 1000, and the available and/or used capacity of memory devices within the computer 1000. To accomplish these monitoring functions, the BMC 1040 is communicatively connected to one or more components by way of the system management bus 1034 in some configurations.

In one configuration, these components include sensor devices 1038 for measuring various operating and performance-related parameters within the computer 1000. The sensors 1038 can be either hardware or software based components configured or programmed to measure or detect one or more of the various operating and performance-related parameters.

It should be appreciated that the functionality provided by the computer 1000 can be provided by other types of computing devices, including hand-held computers, smartphones, gaming systems, set top boxes, tablet computers, embedded computer systems, personal digital assistants, and other types of computing devices known to those skilled in the art. It is also contemplated that the computer 1000 might not include all the components shown in FIG. 10, can include other components that are not explicitly shown in FIG. 10, or might utilize an architecture completely different than that shown in FIG. 10.

Based on the foregoing, it should be appreciated that technologies for identifying firmware functions that were executed in a call chain prior to the occurrence of an error condition, such as an assert or an exception, have been disclosed herein. Although the subject matter presented herein has been described in language specific to computer structural features, methodological acts, and computer readable media, it is to be understood that the present invention is not necessarily limited to the specific features, acts, or media described herein. Rather, the specific features, acts and mediums are disclosed as example forms.

The subject matter described above is provided by way of illustration only and should not be construed as limiting. Various modifications and changes can be made to the subject matter described herein without following the example configurations and applications illustrated and described, and without departing from the true spirit and scope of the present invention.

What is claimed is:

1. A computer-implemented method, comprising:
    searching boundaries of a memory of a computing device for a memory address containing a signature, the search beginning at a memory address specified by an instruction pointer (IP) when an error condition occurred at the computing device;
    identifying a firmware module of a firmware executing on the computing device that includes a function that generated the error condition based, at least in part, on the memory address containing the signature;
    identifying a name of the function that generated the error condition from a plurality of functions in the firmware module using a function mapping file, the function mapping file comprising a memory address for each of the plurality of functions in the firmware module and data identifying a name of each of the plurality of functions in the firmware module;
    identifying one or more functions in a call chain that includes the function that generated the error, the one or more functions being previous in the call chain to the function that generated the error;
    identifying names of the one or more functions in the call chain using the function mapping file; and outputting, from the computing device, a name of the firmware module, a name of the function that generated the error condition, and the names of the one or more functions in the call chain.

2. The computer-implemented method of claim 1, wherein the error condition comprises an assert or an exception.

3. The computer-implemented method of claim 1, wherein the function mapping file is generated at a build time of the firmware module.

4. The computer-implemented method of claim 1, wherein the firmware executes on the computing device in a Pre-EFI Initialization (PEI) phase of operation.

5. The computer-implemented method of claim 1, wherein the firmware executes on the computing device in a Driver Execution Environment (DXE) phase of operation.

6. The computer-implemented method of claim 1, wherein the one or more functions in the call chain are identified using unwind data.

7. The computer-implemented method of claim 1, wherein the one or more functions in the call chain are identified using stack frames.

8. A non-transitory computer-readable storage medium having computer-executable instructions stored thereupon which, when executed by a computing device, cause the computing device to:
search boundaries of a memory of the computing device for a memory address containing a signature, the search beginning at a memory address specified by an instruction pointer (IP) when an error condition occurred at the computing device;
identify a firmware module of a firmware executing on the computing device that includes a function that generated the error condition based, at least in part, on the memory address containing the signature;
identify a name of the function that generated the error condition from a plurality of functions in the firmware module using a function mapping file, the function mapping file comprising a memory address for each of the plurality of functions in the firmware module and data identifying a name of each of the plurality of functions in the firmware module;
identify one or more functions in a call chain that includes the function that generated the error, the one or more functions being previous in the call chain to the function that generated the error;
identify names of the one or more functions in the call chain using the function mapping file; and
output, from the computing device, a name of the firmware module, a name of the function that generated the error condition, and the names of the one or more functions in the call chain.

9. The non-transitory computer-readable storage medium of claim 8, wherein the error condition comprises an assert or an exception.

10. The non-transitory computer-readable storage medium of claim 8, wherein the function mapping file is generated at a build time of the firmware module.

11. The non-transitory computer-readable storage medium of claim 8, wherein the firmware executes on the computing device in a Pre-EFI Initialization (PEI) phase of operation.

12. The non-transitory computer-readable storage medium of claim 8, wherein the firmware executes on the computing device in a Driver Execution Environment (DXE) phase of operation.

13. The non-transitory computer-readable storage medium of claim 8, wherein the one or more functions in the call chain are identified using unwind data.

14. The non-transitory computer-readable storage medium of claim 9, wherein the one or more functions in the call chain are identified using stack frames.

15. A computing device, comprising:
one or more processors;
a memory; and
at least one non-transitory computer-readable storage medium having computer-executable instructions stored thereupon which, when executed by the one or more processors, cause the computing device to:
search boundaries of the memory for a memory address containing a signature, the search beginning at a memory address specified by an instruction pointer (IP) when an error condition occurred at the computing device;
identify a firmware module of a firmware executing on the computing device that includes a function that generated the error condition based, at least in part, on the memory address containing the signature;
identify a name of the function that generated the error condition from a plurality of functions in the firmware module using a function mapping file, the function mapping file comprising a memory address for each of the plurality of functions in the firmware module and data identifying a name of each of the plurality of functions in the firmware module;
identify one or more functions in a call chain that includes the function that generated the error, the one or more functions being previous in the call chain to the function that generated the error;
identify names of the one or more functions in the call chain using the function mapping file; and
output, from the computing device, a name of the firmware module, a name of the function that generated the error condition, and the names of the one or more functions in the call chain.

16. The computing system of claim 15, wherein the error condition comprises an assert or an exception.

17. The computing system of claim 15, wherein the function mapping file is generated at a build time of the firmware module.

18. The computing system of claim 15, wherein the firmware executes on the computing device in a Pre-EFI Initialization (PEI) phase of operation or a Driver Execution Environment (DXE) phase of operation.

19. The computing system of claim 15, wherein the one or more functions in the call chain are identified using unwind data.

20. The computing system of claim 15, wherein the one or more functions in the call chain are identified using stack frames.

* * * * *